United States Patent [19]
Layton et al.

[11] 3,953,667
[45] Apr. 27, 1976

[54] PASSIVE AND/OR ACTIVE IMAGING SYSTEM

[75] Inventors: Allen C. Layton; Werner G. Zinn, Jr., both of Orlando; Antonio J. Mendez, Winter Park; Robert E. Howle, Orlando; Thomas E. Bayston, Maitland, all of Fla.

[73] Assignee: Martin Marietta Corporation, Orlando, Fla.

[22] Filed: June 28, 1974

[21] Appl. No.: 484,028

[52] U.S. Cl. ............................... 178/6; 178/DIG. 8; 178/DIG. 20
[51] Int. Cl.² .......................................... H04N 7/02
[58] Field of Search ................ 178/DIG. 20, DIG. 1, 178/6.8, 6, DIG. 8; 250/199

[56] References Cited
UNITED STATES PATENTS

| | | | |
|---|---|---|---|
| 3,076,961 | 2/1963 | Bibbero | 178/DIG. 20 |
| 3,316,348 | 4/1967 | Hufnagel | 178/DIG. 20 |
| 3,467,917 | 9/1969 | Patel | 250/199 |
| 3,558,812 | 1/1971 | Beckmann | 178/DIG. 20 |
| 3,571,504 | 3/1971 | Kiuchi | 178/DIG. 8 |
| 3,633,996 | 1/1972 | Lean | 250/199 |
| 3,730,985 | 5/1973 | Whitney | 178/DIG. 20 |

*Primary Examiner*—Howard W. Britton
*Assistant Examiner*—Michael A. Masinick
*Attorney, Agent, or Firm*—Julian C. Renfro; Gay Chin

[57] ABSTRACT

A forward looking infrared system in which the usual FLIR is augmented by the addition of active laser illumination in order to enhance the FLIR's capability to discern in a scene certain details, such as manmade objects, especially under conditions of thermal washout. The laser is coded, and appropriate decoding electronics are provided to enable the FLIR to differentiate reflected laser radiation from thermal radiation of the scene. Therefore, it is unnecessary to endeavor to increase the brightness of the laser to an extent sufficient to overwhelm the natural thermal radiance level of the scene. Both types of radiation simultaneously impinge on a common detector, thereby eliminating the necessity for dual detectors and/or dual optics, and avoiding registration problems normally associated with the use of dual components. Signal processing is available to enable a viewing of the usual FLIR information, the augmenting information, or arbitrary combinations of these, as the viewer may elect or as conditions may require.

13 Claims, 6 Drawing Figures

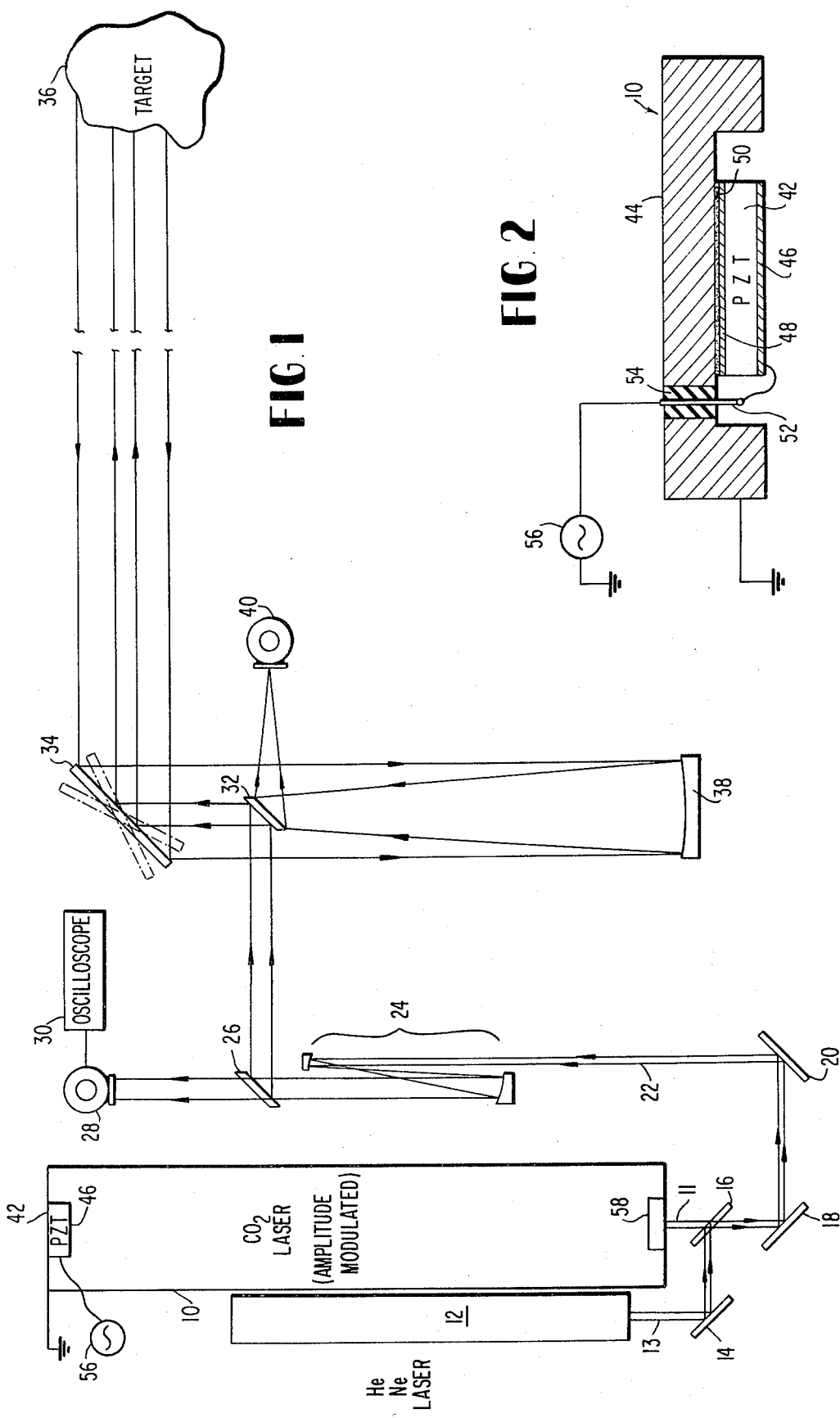

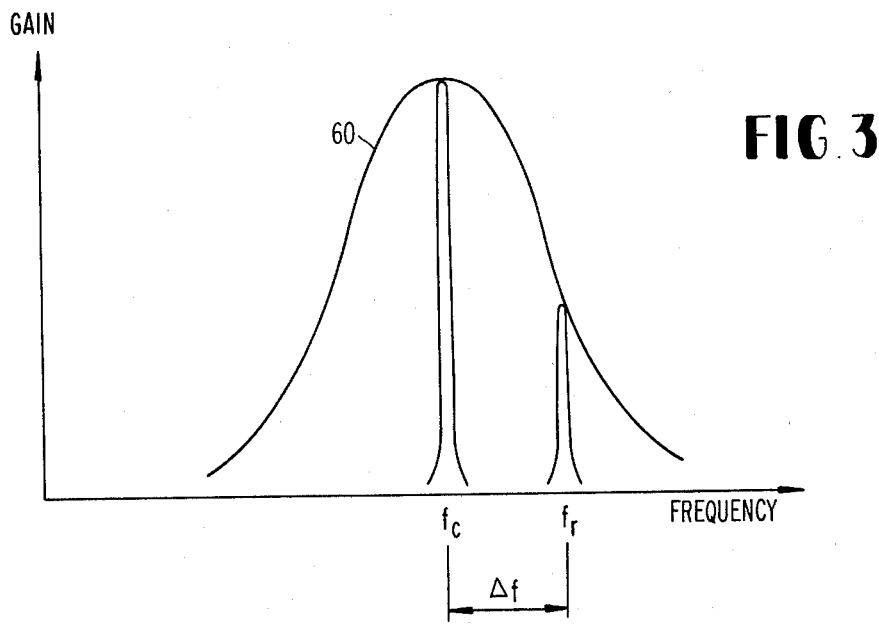
FIG. 3
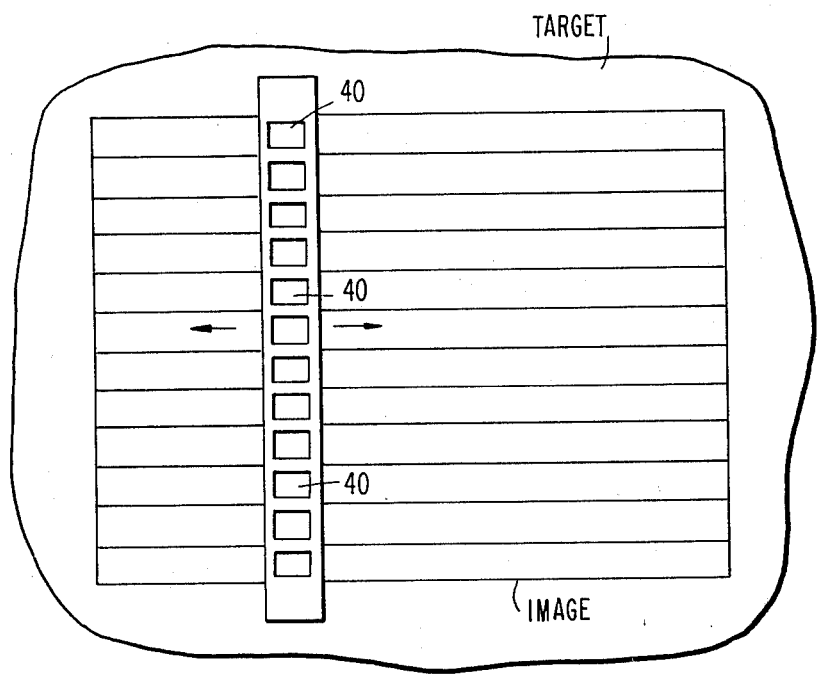
FIG. 5
FIG. 6
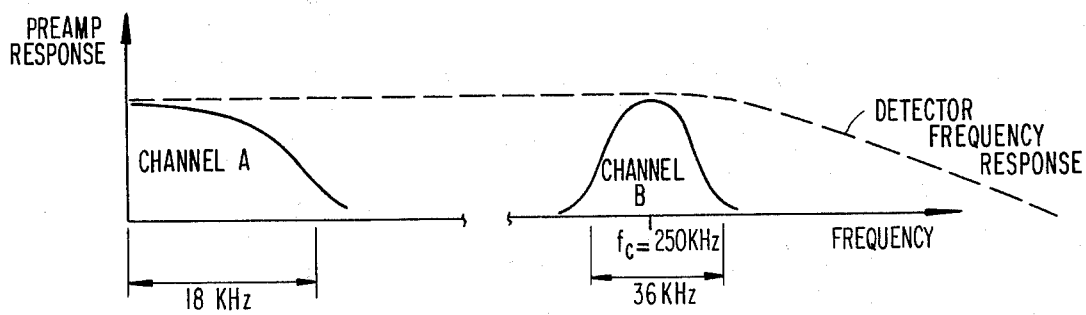

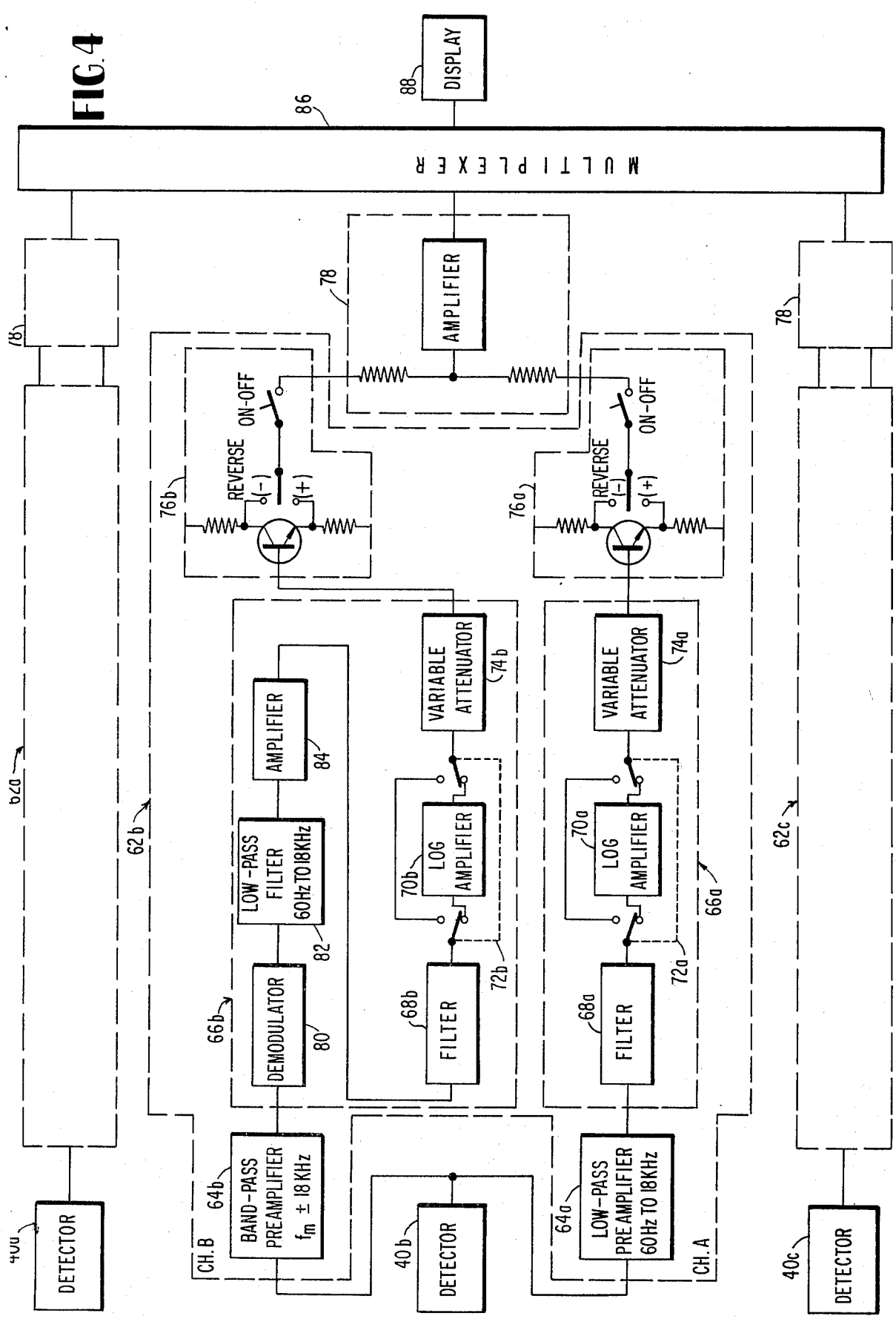

PASSIVE AND/OR ACTIVE IMAGING SYSTEM

BACKGROUND OF THE INVENTION

1. Field of the Invention:

The invention relates generally to the field of infrared imaging systems for displaying a visible image of the infrared or thermal radiation image of a real scene, and, more particularly, to such a system in which the scene is simultaneously illuminated by a coded light beam, thus making possible the simultaneous acquisition of a reflected light image of the scene whose thermal energy is being sensed.

2. Description of the Prior Art:

There are three general approaches to target acquisition with the aid of electro-optical devices, with a first of these involving the viewing of a scene under ambient illumination, and then converting the acquired information into an electronic signal by the use of a photocathode. TV and low light level TV (LLLTV) are representative of this type of approach.

Another approach involves viewing a scene in which artificial illumination, such as supplied by a GaAs diode, is utilized to augment or entirely replace ambient illumination. Laser-aided, range-gated TV's are representative of this second approach.

The third approach involves viewing the scene by means of its natural thermal radiation, and then converting the information by the use of infrared-sensitive detectors into an electronic signal. Forward looking infrared (FLIR) devices are commonly used in accordance with this technique.

In all three approaches, the electronic signals are suitably processed, intensified, and then reconverted into a brightness pattern which is presented as a display to the operator. Target acquisition decisions involving detection, aspect and pattern recognition, and identification are made by the operator.

A serious deficiency associated with the first approach described above involves the fact that ambient illumination goes through extreme dynamic range variations in the course of the daily and monthly natural light level cycles. Furthermore, the daily and monthly light level cycles are accompanied by spectral distribution cycles, so no one photocathode selection, intensifier technique, or optical design is adequate to cope with these extremes.

The second approach described above operates optimally under natural ambient illumination conditions corresponding to a quarter moon or less, but commonality of day and reduced light level optical systems design remains a problem. The required range-gating creates search and detection problems that can be considerable.

The third approach involving the use of FLIR'S has proven itself operationally to have outstanding day/night detection and aspect recognition performance. However, FLIR'S often suffer from deficiencies in pattern recognition, and quite importantly, they do not have "identification" capability, particularly against terrestrial targets. Also, in the course of a day, there are two periods of thermal washout where detection can become problematical, particularly for stationary targets. Washout is also a factor in rainy weather, for rain tends to remove temperature differences.

It is known in the prior art to acquire a remove target by passively sensing it by means of its thermal radiation, and then after acquisition, using a laser to determine the range of the target. Such a system is disclosed in U.S. Pat. No. 3,644,043.

Acquisition of a remote target or scene by simultaneous acquisition of both the radiated thermal and reflected laser energy images has not been possible in the prior art with low power lasers inasmuch as the radiated thermal energy of a scene, especially in terrestrial scenes, is very intense and tends to obliterate the reflected laser energy image, unless the illuminating laser beam is made sufficiently intense so as to be seen as a signal superimposed on the radiated thermal signal. Furthermore, the radiated thermal and laser illuminating signals often have opposite polarities or senses of brightness so as to tend to cancel each other out in an energy detector employed to detect both the radiated thermal energy and the reflected laser energy.

It is most important to note in the utilization of FLIR systems that the problems encountered are often not inherent in the FLIR, but rather involve the nature of the thermal signatures of the scene. The problems of pattern recognition and thermal washout could be resolved if the FLIR could alternatively view, not only the thermal radiation from the scene, but also reflected radiation from an artificial light source, such as a $CO_2$ laser co-located with the FLIR. By viewing the scene inflectance, the FLIR could then discern features which have no significant thermal signature and which, therefore, lead to faulty pattern recognition and thermal washout. Furthermore, target acquisition time line improvements will be observed when passive and active viewing capabilities are utilized cooperatively.

In order to implement such a dual capability FLIR, it is important to observe several criteria. First of all, the $CO_2$ laser illumination must scan synchronously with the FLIR detector array. Secondly, the FLIR should simultaneously sample the thermal and $CO_2$ laser signals. Thirdly, the FLIR must utilize signal processing which allows it to discriminate between thermal and $CO_2$ laser signals. It is important to note that, if these latter three criteria are not met simultaneously, then excessive $CO_2$ laser power is required, the FLIR performance is compromised, and the thermal and $CO_2$ laser signals may tend to conflict with each other, thus leading to another kind of washout.

SUMMARY OF THIS INVENTION

In accordance with this invention, we have provided a novel passive/active FLIR selectively usable in several different modes: a passive (thermal) mode only; an active (laser) mode only; and a combined passive/active mode in which the images associated with the passive and active modes may be combined so that they may be shown together on a single display in a highly advantageous manner. Consequently, an operator can select the combination of images which optimizes the target and context acquisition.

Advantageously, our new device manifestly meets the essential requirements set forth hereinabove, in that the laser scans synchronously with the detector array; the same optics and detectors sample both the thermal and laser signals; and quite importantly, the receiver can distinquish between thermal and laser radiation.

It will be appreciated that the thermal scene which the FLIR images and reads is CW and has a day and night radiance of about 20 to 50 watts/$m^2$-SR in the 8 to 14 micron wavelength band. Consequently, in order for the FLIR to sense the CW $CO_2$ laser splash superimposed on the thermal scene, either the $CO_2$ laser must be very bright to avoid masking by the thermal scene, or else the FLIR must be able to discriminate between the thermal and $CO_2$ signals.

For obvious reasons, we have adopted the latter alternative and utilize a novel signal processing technique that enables a FLIR to electronically discriminate between thermal and $CO_2$ laser radiation. Our invention makes use of the fact that, for parallel processing, the information bandwidth in each detector is limited to approximately 0 to 20 kHz. Trimetal infrared detectors, such as HgCdTe and PbSnTe, can have bandwidths greater than one MHz, so we have modulated the $CO_2$ laser illuminator at a frequency above 20 kHz, but below the detector roll off which occurs at approximately 2 MHz for suitably selected detectors.

We preferably utilize a dual channel arrangement in which the thermal scene can be sampled in the FLIR detector channel in the 0 to 20 kHz frequency range, and the $CO_2$ laser signal can be sampled with an equivalent bandwidth but centered near the modulation frequency, such as at 250 kHz. Each IR detector in the FLIR has dual preamp channels with separate gains, followed by some appropriate detector channel signal processing. The passive and active signals may then may combined in a mixer and further amplification or processing employed.

If the configuration is such as to require multiplexing, this can be done at the detector, or at some other suitable place in the system, depending on the system requirements and constraints.

As will be more apparent as the description proceeds, our invention preferably utilizers a $CO_2$ laser that has been amplitude-modulated, and whose output is directed along an optical path that is also utilized by the thermal detection arrangement. We prefer to utilize Piezoelectric Amplitude Modulation (PAM) as a convenient method of producing 100 percent depth of modulation of the $CO_2$ laser at frequencies up to 1 Megahertz. Pulse modulation could also be used with a minor modification of the processing electronics to take into account the wider processing BW necessary for a pulse detection. The required BW is of course dependent on the pulse width. It would be possible to process a 250 kHz PRF pulsed laser beam with the same electronics if the pulse width were near the pulse width of the PAM modulated beam. This modulation arrangement has very low insertion loss and also requires very little drive power. The effect involved in the use of PAM is quite similar to reactive Q switching, for the motion of the piezoelectric crystal changes the laser cavity length and causes the cavity resonance to move with respect to the laser gain line. As the cavity resonance is rapidly moved down the side of the gain line from the peak, the laser power decreases, and if the cavity resonance is moved to a sufficiently low value on the gain line, the laser will extinguish. By causing the cavity resonance to move along the gain line in a sinusoidal fashion, the laser gain, and hence the laser output power, is modulated in a manner consistent with the coding desired.

It is therefore to be seen that our invention may be characterized as involving apparatus able simultaneously to detect and display both the thermal radiation emanating from a scene as well as laser radiation reflected from the scene, with a display arrangement which will greatly enhance the target signature. In order that the advantages inherent in our invention may be accomplished, we have moved a portion of the laser radiation out of the thermal frequency spectrum so that the reflected laser radiation may be separately detected, amplified and processed. In this way it is possible to use the same infrared detector as was used in connection with the creation of a thermal display of the target, without impairing the results obtained. As should be apparent, this highly advantageous arrangement makes it possible for us to completely avoid the registration problems that are necessarily involved when separate detectors are used.

It is therefore a primary object of this invention to provide a forward looking infrared system in which laser augmentation is utilized in a highly effective manner, thus to enhance the capability of the FLIR to discern manmade objects.

It is another important object of our invention to provide target enhancement by the use of an infrared sensor arrangement able simultaneously to sense and display both the thermal energy emanating from a target and laser energy reflected from the target.

It is another object of our invention to provide a feasible way of coding a laser and utilizing appropriate decoding electronics in a FLIR, such that the same IR detector used for detecting the laser energy reflected from a selected target may also be used for detecting thermal energy emitted by the target.

It is yet another object of our invention to provide a novel signal processing technique that enables a FLIR electronically to discriminate between thermal radiation and low power $CO_2$ laser radiation, thus making it unnecessary to increase laser power as the natural thermal radiance of a scene increases.

It is still another object of our invention to provide a passive/active FLIR selectably usable in several different modes, including a passive or thermal mode; an active or laser mode; and a combined active/passive mode in which the active and passive modes are used simultaneously in such a manner as to optimize target acquisition.

It is yet still another object of our invention to provide a dual capacity FLIR utilizing a laser in concert with a thermal detector, such that the laser illumination can be scanned synchronously with the FLIR detector array, and with the arrangement then involving a simultaneous sampling and processing of the thermal and laser signals in such a way as to make possible an effective discrimination between thermal and laser signals.

Still another object of our invention is to provide a FLIR system able to distinguish laser radiation from thermal radiation, thus enabling a single radiation detector to be used instead of dual detectors and their accompanying registration problems.

BRIEF DESCRIPTION OF THE DRAWINGS

FIG. 1 is a schematic diagram of a preferred embodiment of the improved passive and/or imaging system of the invention;

FIG. 2 is a more detailed schematic diagram of a portion of the $CO_2$ laser illustrated in FIG. 1;

FIG. 3 is a gain-vs.-frequency plot of the $CO_2$ laser;

FIG. 4 is a schematic diagram of the preferred embodiments of the electronic decoding circuit connected to each detector in the energy sensing detector array of FIG. 1;

FIG. 5 is a schematic diagram of the preferred embodiment of the detector array; and FIG. 6 is a graph showing the equivalent frequency responses of the passive and active decoding channels of the decoding circuit of FIG. 2.

DETAILED DESCRIPTION OF THE PREFERRED EMBODIMENT

Image forming, framing electro-optical system which derive their imaging information from the thermal radiation of a scene are called, his historical reasons, Forward Looking Infrared systems (FLIR's). Recently, however, they have also been called Framing Infrared systems (FIR's).

A FLIR consists basically of (1) infrared optics; (2) an optom-mechanical scanner; (3) a linear array of detectors which, with the aid of the scanner, samples all of the imaging information in a portion of the focal plane defined by the optics; and (4) a signal processing unit, such as an electronic or electro-optical multiplexer, which converts the plurality of signals from the detector array into a single signal which may then be used to drive conventional display units, such as cathode ray tubes. The linear array of detectors in most modern FLIR systems contains approximately 200 detectors, each with its own preamplifier. There may be one or more multiplexers between the detectors and the display. Even though the radiated thermal or infrared energy from a scene may be very strong, the thermal image may have little or no useful contrast in it. The thermal scene image is constructed from radiation corresponding to the thermal energy balance in the objects in the scene. In other words, the thermal scene contrast is determined by emissivity and reflectivity values and temperature differences. Temperature differences in turn depend to a large extent on scene history and ambient conditions. For instance, in the case of heat generating equipment, such as vehicles, the temperatures depend on when the equipment was operating, for how long, and ambient cooling factors. Each other objects the contrast would depend on exposure to the sun, and of course, there may be considerable difference between the day and night contrast of a scene. There is also the common condition where a scene or target could be above background temperature during the day because of solar radiation absorption and below the background temperature at night due to radiation cooling, together with a transition period where the scene would have no contrast at all and be somewhat invisible.

On the other hand, if the same scene is illuminated with laser radiation, an augmented scene image is constructed from the laser radiation reflected from objects in the scene. The scene contrast in the reflected laser radiation is a function of object reflectivity alone and, hence, is independent of the recent thermal history of the scene.

FIG. 1 is a schematic diagram of a preferred embodiment of the improved passive and/or active imaging system of the invention as applied to a FLIR. A low power $CO_2$ laser 10 produces an amplitude-modulated laser beam 11. Adjacent to laser 10 is a helium-neon laser 12 employed an an alignment aid and for checking out the optics. Laser 12 is not only small and relatively inexpensive, but also its radiation is at a wavelength which falls within the human spectral response. The output beam 13 of the helium neon laser 12 is directed at a mirror 14 disposed at a 45° angle, with the output from this mirror being directed at a 45° dichroic mirror 16. Dichroic mirror 16 reflects virtually all of the radiation from the helium neon laser 12 downwardly, whereas the output beam 11 from the $CO_2$ laser 10 passes through the mirror 16. As a result, laser radiation of both types is directed against a mirror 18 and thence to mirror 20, with both of these latter mirrors also being disposed at a 45° angle.

The composite beam 22 reflected from mirror 20 passes through a reflective beam expander 24 to a beam splitter 26 which transmits 10% of the beam to a detector 28 whose electrical output is applied to a monitoring oscilloscope 30 to provide a display of the laser beam amplitude modulation. The remaining 90% of the beam is reflected by beam splitter 26 to another 45° mirror 32, which reflects the beam to a raster scanning mirror 34 which scans the laser beam across a portion of the remote target or scene 36.

The raster scanning mirror 34 is oscillated in a left and right sense at 30 cycles per second, for example. In addition, by means of a cam or the like, this mirror is caused to sweep slowly in an up and down sense so as to bring about a complete scan of the target say every 7 seconds. As is obvious, there is a relationship between the left-right oscillation and the slow vertical movement, so if the oscillation rate is increased, the vertical scan rate can be proportionately increased and still produce an effective target scan.

The laser energy reflected from the target, together with the infrared or thermal energy radiating from the target, is reflected from the scanning mirror 34 and directed to a parabolic collecting mirror 38. The beam is then reflected from the mirror 32 onto a detector 40 which is capable of detecting both the thermal infrared and reflected laser radiation.

Detector 40 is preferably one detector or linear array of such detectors in which case the vertical scan capability of mirror 34 is unnecessary. Only a single detector may of course be used, but in that case, real time scanning of the target cannot be achieved. Each detector 40 is capable of converting both the infrared and laser radiations into corresponding electrical signals representing thermal and laser scene information, respectively.

Both the scene sensing detector 40 and the laser monitoring detector 28 may be of either the PbSnTe or HgCdTe type, but the former type is preferred since it produces a higher output voltage, thereby requiring less amplification, even though it has a more limited frequency response than the latter type. Either type of detector is placed between the walls of a Dewar flask filled with liquid nitrogen, with a window in the outer wall to permit the laser and/or thermal radiations to pass therethrough and impinge upon the detector.

As shown in FIG. 1 and in more detal in FIG. 2, the $CO_2$ laser 10 is amplitude-modulated by means of a piezoelectric crystal (PZT) 42 secured to one flange 44 of the laser. crystal 42 has a front and back electrodes 46 and 48, respectively. An epoxy adhesive 50 bonds the crystal to the flange. The back electrode 48 is electrically grounded through the flange, and the front electrode 46 is coated with gold and optically polished to provide a reflecting surface. An electrical lead 52 passes through an insulator 54 in flange 44 and is connected to electrode 46. An A.C. source 56 applies across the crystal's electrodes an A.C. voltage of, say, 15 volts peak-to-peak at the desired modulation frequency $f_m$ of, for example, 250 kHz. The crystal is selected in accordance with the modulation frequency to be used. The piezolectric element vibrates at a rate identical to the frequency of the applied voltage. Action takes place between the reflective surface of electrode 46 and a partially transparent output mirror 58 at the opposite end of the laser cavity. The mirror 58 is typically 80% reflective and 20% transmissive and transmits the output laser beam to the dichroic mirror 16, as previously described. Inasmuch as the motion of the PZT crystal 42 serves to change the effective length of the cavity, cavity resonance is caused to shift with respect to the laser gain line 60 shown in FIG. 3.

As should now be apparent, by causing the cavity resonance point to move from a high value $f_c$ to a lower value $f_r$ on the gain line of the laser, and then back to the high value at a rapid rate, the laser gain, and hence the output power, is appropriately modulated, thus producing the desired laser coding in the form of an amplitude modulation at the frequency $f_m$. The bandwidth of the laser gain curve at its half power points is typically in the range of 50 to 100 mHz, the bandwidth of the cavity resonance is approximately 10 kHz, and the frequency shift $\Delta f$ of the cavity resonance for 100% modulation depth is approximately 50 mHz.

Turning now to FIG. 4, it will there be seen that we have shown a typical embodiment of our invention, involving detectors 40$a$, 40$b$, and 40$c$, with the electrical output of these detectors being connected to signal decoding and processing circuits 62$a$, 62$b$, and 62$c$, respectively. Exemplary circuit 62$b$ is revealed in this embodiment to have a passive channel A and an active channel B. The passive channel A contains a low pass preamplifier 64$a$ which passes signals only in the frequency range of 60 Hz to 18 kHz sufficient for passing the thermal image and time average laser signals while blocking the higher frequency reflected laser energy signals.

The active channel B contains a band pass preamplifier 64$b$ passing only signals in the range of the laser modulation and its sidebands imposed by the scene information and sampling size, typically $f_m \pm 18$ kHz, so that the reflected modulated laser signals are passed while the lower frequency infrared signals are blocked. Following each of the preamplifiers 64$a$ and 64$b$ are corresponding signal processors 66$a$ and 66$b$. These processors perform conventional processing operations on the output signals from the preamplifiers. For example, the signals may be compressed by means of logarithmic amplifiers or AGC loops. Furthermore, the processors may contain filtering circuits for selecting certain frequencies, thereby accenting certain scene configurations, More specifically, channel A processor 66$a$ contains in series a lowpass filter 68$a$ which passes only frequencies in the 60 to 18 kHz range, a logarithmic amplifiers 70 having a shorting switch 72$a$, a variable attenuator 74$a$, and an ON/OFF/PHASE REVERSAL control 76$a$, whose output is fed to one input of a video mixer 78.

Channel B processor 66$b$ contains in series a demodulator 80, a low pass filter 82, an amplifier 84, a lowpass, high pass, or bandpass filter 68$b$, a logarithmic amplifier 70$b$ having a shorting switch 72$b$, a variable attenuator 74$b$, and an ON/OFF/PHASE REVERSAL control 76$b$ whose output is applied to the other input of the video mixer 78.

The output of the mixer 78 associated with each detector 40 is applied to a conventional multiplexer 86 which drives a video display device 88.

Each channel processor can be manually or automatically controlled to vary the scene image displayed on unit 88. For example, the variable attenuators 74$a$ and 74$b$ can be individually adjusted to vary the outputs of their channels. Furthermore, logarithmic amplifiers can be individually by-passed when the dynamic range of its channel's detector signal is small.

Furthermore, ON/OFF/REVERSE Controls 76$a$ and 76$b$ can be manually or automatically operated to control the channel outputs fed to video mixer 78. For example, when a Control is in the ON position, its channel signal is passed to the mixer; mixer; when the Control is in the OFF position, its channel signal is blocked from the mixer; and when it is in the REVERSE position, the inverse of the signal is applied to the mixer. Consequently, depending upon the depending of the Controls 76$a$ and 76$b$, the output of mixer can be chosen to depend on the scene conditions and the requirements of the system and may be either +A, −A, +B, −B, A − B, −A + B, −A −B, or A + B, As an example of the use of this improved imaging system, consider a vehicle, such as a truck, tank, etc., which has no recent thermal history and is possibly partially obscured by foliage. Under such conditions the target is almost impossible to detect with a conventional infrared imaging system since the target blends with the cluttered background. However, with the laser image augmentation provided by the present invention, the target presents a very bright image because of its high reflectivity, but the background substantially completely disappears because of the very low reflectivity of natural objects, such as the foilage, at the $CO_2$ laser output wavelength.

Under these conditions, it would be desirable to have the thermal scene from channel A appear on the display at a low level to provide topographical information and then have the laser image from channel B added to the thermal scene at a higher level to provide target contrast and hence target location within the overall scene. In this case, both of the controls 76$a$ and 76$b$ would be in their ON positions.

As a result of the improved imaging system described above, both the passive thermal and the reflected laser images of the remote scene are simultaneously acquired. This result is accomplished by using the optics and infrared sensors of the infrared receiver for detecting both the infrared signals and the reflected laser signals and also for scanning the illuminating laser beam across the same field of view as seen by the sensors. The high frequency amplitude modulation of the laser beam permits a low power $CO_2$ laser to be used while at the same time permitting both the infrared and laser image signals to be compatibly detected by the same infrared sensors or detectors. This assures geometric registration between the passive (channel A) and active (channel B) scene and electrical information. Even though in the preferred embodiment the illuminating laser beam is coded by high frequency amplitude modulation, other coding techniques and corresponding decoding techniques may be used for permitting the laser image information to be separated from the thermal image information.

In the preferred embodiment, the same optics scan the scene across the detector array as scan the illuminating laser beam across the scene. It is necessary that any particular scene element that is impinging on the detector array be simultaneously illuminated by the laser. For maximum efficiency, the laser beam divergence must be very close to the instantaneous detector field of view (which is normally quite small), and the laser transmitter-sensor registration over the full field of view must be preserved. For this reason, it is desirable to use the same scan for both the scene and laser scanning. However, two different scanners, one scanning the scene across the detector and the other scanning the laser across the scene, may be used, but in this case the two scanners must be similar, synchronized to each other, and boresighted to each other.

Again, in the preferred embodiment described above, a linear array of detectors or sensors is used. However, the invention is not limited to such a configuration, since the same inventive concept is also applicable to infrared imaging systems utilizing a single detector, or a serial array acting as a single detector, to scan the scene. The shape of the laser illumination beam will generally depend on the type of detector array. Since the instantaneous detector field of view or portion of the instantaneous field of view is also illuminated by the laser beam, if a single detector is used, then the laser beam would be pencil-shaped with a narrow beam divergence angle. However, as in the preferred embodiment, if the detector is a linear array of detectors, then the laser beam is fan-shaped to correspond to a portion of, or the entire, instantaneous field of view of the array. Of course, the signal processing will depend also on the detector configuration. For the case of a single detector, the scene information, both thermal and laser, is disserted serially and can be applied to a cathode ray display using conventional television techniques. When a linear array is used as in the preferred embodiment, then the outputs of the individual detectors are multiplexed to generate a single, serial chain of information signals suitable for application to the cathode array tube. In other words, any detector configuration can be used for the laser imaging so long as the corresponding laser beam is suitably shaped.

FIG. 5 schematically illustrates in more detail an array of the detectors 40. The individual detectors are arranged in a vertical linear array, and the field of view of the scene or target is optically scanned across the array. As mentioned above, in this case the laser beam would be shaped to be elongated in the long dimension of the detector array. This elongated or fan-shaped beam is scanned across the scene synchronously with the motion of the scene image across the detector array. The detector array completes a scan in one direction in what is called the field time, so the scanning of the laser is said to be accomplished at the field rate. The fan-shaped laser illuminating beam is scanned at the field rate so that only that portion of the scene which is being instantaneously sampled or sensed by the detector array is simultaneously illuminated by the laser beam, thereby minimizing the power requirements of the $CO_2$ laser.

FIG. 6 illustrates the equivalent frequency response of channels A and B of the decoding and processing circuit illustrated in FIG. 4. The infrared sensor or detector array has an information bandwidth associated with it. This bandwidth is determined by the optics design, detector size, number of individual detectors, frame rate, etc., essentially in the same fashion as in a television system. In the preferred embodiment of the invention, because of the use of a linear array of infrared detectors which scan the scene image simultaneously, each detector has assigned to it an information bandwidth which is a small fraction of the entire array's bandwidth. With each detector, the information bandwidth is determined by the band pass characteristic of its associated preamplifier. If coded laser information is being processed, then the coding or modulation acts as an information carrier, and the information bandwidth is transferred around the coding or modulation frequency, e.g., 250 kHz. Thus as illustrated above, the uncoded (thermal and and coded (laser) signals can in fact be separated from each other at the outputs of the individual detector. That is, these signals can be sensed by the same optics and detectors and separated by the preamplifiers 64a and 64b having suitable bandpasses. As a result, two simultaneous and complementary sets of scene information are provided. By use of the controls 76a and 76b in conjunction with the mixer 78, the operator can then cause either image signal to be displayed alone or both signals to be displayed simultaneously in arbitrary ratios of intensity. Since the thermal and laser image signals each contain significant and complementary scene information, an important advantage of the invention is its ability to produce and process these two distinct kinds of image information simultaneously in a single unitary infrared imaging receiver.

The passive and/or active imaging system described above is applicable to the acquisition of air-to-ground targets, or to a guidance system for air-to-ground weapons operating against targets that radiate thermally or reflect detectable levels of infrared energy in the same wavelength band.

Furthermore, the laser enhancement feature of the invention is compatible with any optomechanically scanned infrared receiver, and the receiver may have either a single infrared detector or an array of detectors.

The infrared scanner or receiver can operate in the 3–5$\mu$m or 8–14$\mu$m wavelength bands with a corresponding modulated CW laser or high PRF pulsed laser. The laser modulation frequency or PRF can be at any frequency above the sensor information bandwidth and below the detector's sensitivity roll-off.

Furthermore, the infrared detectors may be selected from, but are not limited to, HgCdTe, HgGe and PbSnTe for 8–14$\mu$m applications and InSb, HgCdTe for 3–5$\mu$m applications.

Moreover, as mentioned above, this invention is not limited to the use of only $CO_2$ lasers or to PAM signal coding techniques, since pulsed laser sources may be used either at 10.6 microns or in other spectral regions. Detection of a pulsed laser source can be implemented by a minor modification to the processing electronics. This modification would entail matching the electronic processing bandwidth capability to the pulse width of the pulsed laser.

If the pulsed laser waveform were a square wave, the detection of that exact waveform would require a wide bandwidth detector and processing electronics capable of passing the many Fourier frequency components of the square wave signal (i.e., wide bandwidth processing electronics). However, for a pulsed waveform, the optimum signal-to-noise ratio (S.N.R.) is often obtained when the bandwidth is set equal to the inverse of the pulse duration time. This reduces the bandpass of the signal processing electronics to a usable range.

The major advantage of the pulsed system is an improvement in the system signal-to-noise ratio. The S.N.R. is proportional to the quantity $$\frac{P}{\sqrt{B}},$$

where P is the peak power, and B is the bandwidth. Therefore, if the average power is held constant, the peak power can be increased by producing narrow pulses and the bandwidth need only be increased by a factor equal to the pulse narrowing. For example, if the peak power were doubled, the bandwidth B would also be doubled, and the S.N.R. would increase by $\sqrt{2}$.

The major difficulty in the use of a plused system is the high P.R.F. required in an imaging system. Typically the P.R.F. must equal or exceed the desired data rate. For example, the present implementation of the passive and/or active imaging system would require a P.R.F. equal to or greater than 18 kHz. Indeed, a mirror technology configuration would have a requirement for a P.R.F. $\geq$ 100 kHz, if the P.R.F. is used as an information carrier. The detectors inherent in the FLIR receiver have bandwidths of about 1 mHz. Thus, pulse widths (for a pulsed illuminator) are limited to about $10^{-6}$ second or greater. The average illuminator power, then, is given by $$P(avg) \sim P(peak) \cdot P.R.F. \cdot \text{pulse duration}$$
$$\sim P(peak) \cdot 10^5 \cdot 10^{-6},$$

so that $\frac{P(peak)}{P(avg)} \sim 10$, and $$\frac{S.N.R. (pulsed)}{S.N.R. (CW)} \sim 3$$

What is claimed is:

1. In an infrared imaging system for producing a display representative of the infrared radiation image of a remote scene, and including: electro-optical detector means for scanning the scene and producing from the radiated thermal energy first electrical signals representing the infrared image, and display means responsive to the electrical signals for displaying a visible image of the infrared image; the improvement comprising:
   a. infrared laser means synchronized with the scanning of said detector means for simultaneously illuminating with a coded infrared laser beam the same field of view of the scene as scanned by said detector means, said detector means also producing from the reflected laser energy second electrical signals representing the reflected laser energy image of the scene, said first and second signals forming a composite signal;
   b. common optical means for scanning the scene with said detector means in order to detect the emitted and/or reflected infrared energy;
   c. decoder means coupled to said detector means for receiving said composite signal and electrically separating said first and second signals; and
   d. means coupled between said decoder means and said display means for selectively applying said first and second signals to said display means for displaying either the emitted or reflected infrared energy images of the scene, or both.

2. The improvement as defined in claim 1 wherein said decoder means further comprises signal processor means for controlling the relative amplitudes of the first and second signals applied to said display means.

3. The improvement as defined in claim 1 wherein the coded laser beam is a $CO_2$ laser beam amplitude-modulated at a frequency substantially higher than the information bandwidth of the infrared radiation but with the frequency sensitivity spectrum of said detector, and wherein said decoder means comprises frequency selective means for electrically separating said first and second signals.

4. The improvement as defined in claim 3 wherein said laser means comprises:
   a. a resonant cavity having a partially transmissive mirror at one end thereof for transmitting the coded laser beam;
   b. piezoelectric crystal means secured to the opposite end of said cavity and containing a reflective surface to define with said mirror the resonant length of said cavity; and
   c. means for applying to said piezoelectric crystal means an A.C. voltage having a frequency equal to a desired frequency of the amplitude modulation of the low beam, whereby the laser beam is amplitude-modulated at said desired frequency.

5. The improvement as defined in claim 3 wherein said decoder means comprises:
   a. a first frequency selective channel including a low pass filter for passing only said first signals;
   b. a second frequency selective channel including a band pass filter for passing only said second signals; and
   c. non-linear amplifying means in each of said first and second frequency selective channels for selectively limiting the dynamic ranges of said first and second signals, respectively.

6. The improvement as defined in claim 5 wherein said means for selectively applying said first and second signals to said display means comprises:
   a. first on/off/phase reversal means connected to the output of said first frequency selective channel for selectively passing said first signal with or without phase reversal;
   b. second on/off/phase reversal means connected to the output of said second frequency selective channel for selectively passing said second signal with or without phase reversal; and
   c. signal combining means connected to receive the outputs of said first and second on/off/phase reversal means for providing a combined signal output to said display means.

7. In the method of sensing and displaying the infrared radiation image of a scene, the improvement comprising the steps of:
   a. illuminating the scene with a coded infrared laser beam;
   b. simultaneously sensing the infrared radiation and reflected laser energy images of the scene with a common detector and producing a composite signal including both infrared and coded laser image signals;
   c. separating the coded laser signals from the infrared image signals; and
   d. selectively applying the separated signals to a display device, so that either or both images are visibly displayed.

8. The method as defined in claim 7 wherein the step of selectively applying the separated signals to a display device comprises the steps of:
   a. selectively passing the coded laser signals with or without phase reversal;

b. selectively passing the infrared image signals with or without phase reversal; and
c. combining the selectively passed signals prior to applying to a display device.

9. An infrared imaging system for producing a display representative of a greatly enhanced radiation image of a remote scene, said system including electro-optical detector means for scanning the scene and producing from the radiated thermal energy, first electrical signals representing the infrared image, infrared laser means synchronized with the scanning of said detector means for simultaneously illuminating, with a coded infrared laser beam, the same field of view of the scene as scanned by said detector means, said detector means also producing from the reflected laser energy, second signals representing the reflected laser energy image of the scene, said first and second signals forming a composite signal, decoder means coupled to said detector means for receiving said composite signal electrically separating said first and second signals, display means for displaying a visible image of the scene, and means coupled between said decoder means and said display means for selectively applying said first and second signals to said display means, such that either the emitted or the reflected infrared energy images of the scene, or both, may be selectively amplified and displayed.

10. The system as defined in claim 9 wherein the coded laser beam is a $CO_2$ laser beam amplitude-modulated at a frequency substantially higher than the information bandwidth of the infrared radiation but within the frequency sensitivity spectrum of said detector, and wherein said decoder means comprises frequency selective means for electrically separating said first and second signals.

11. The system as defined in claim 9 in which the laser beam is amplitude modulated by the use of a piezoelectric device.

12. The system as defined in claim 9 wherein said decoder means includes:
a. a first frequency selective channel including a low pass filter for passing only said first signals;
b. a second frequency selective channel including a band pass filter for passing only said second signals; and
c. non-linear amplifying means in each of said first and second frequency selective channels for selectively limiting the dynamic ranges of said first and second signals, respectively.

13. The system as defined in claim 12 wherein said means for selectively applying said first and second signals to said display means includes:
a. first on/off/phase reversal means connected to the output of said first frequency selective channel for selectively passing said first signal with or without phase reversal;
b. second on/off/phase reversal means connected to the output of said second frequency selective channel for selectively passing said second signal with or without phase reversal; and
c. signal combining means connected to receive the outputs of said first first and second on/off/phase reversal means for providing a combined signal output to said display means.

* * * * *